United States Patent
Young

(10) Patent No.: US 10,883,607 B2
(45) Date of Patent: Jan. 5, 2021

(54) HYDRAULIC SEAL ARRANGEMENT

(71) Applicant: ROLLS-ROYCE plc, London (GB)

(72) Inventor: Colin Young, Derby (GB)

(73) Assignee: ROLLS-ROYCE plc, London (GB)

(*) Notice: Subject to any disclaimer, the term of this patent is extended or adjusted under 35 U.S.C. 154(b) by 120 days.

(21) Appl. No.: 16/155,152

(22) Filed: Oct. 9, 2018

(65) Prior Publication Data

US 2019/0120386 A1 Apr. 25, 2019

(30) Foreign Application Priority Data

Oct. 24, 2017 (GB) .................................. 1717431.9

(51) Int. Cl.
*F16J 15/42* (2006.01)
*F01D 25/18* (2006.01)

(52) U.S. Cl.
CPC ............ *F16J 15/42* (2013.01); *F01D 25/183* (2013.01); *F05D 2240/60* (2013.01)

(58) Field of Classification Search
CPC .......... F16J 15/42; F16J 15/40; F01D 25/183; F01D 25/18; F05D 2240/60; F05D 2240/61
See application file for complete search history.

(56) References Cited

U.S. PATENT DOCUMENTS

| 4,527,802 A * | 7/1985 | Wilcock | F16J 15/42 277/302 |
| 5,239,750 A * | 8/1993 | Wright | F16J 15/42 277/427 |
| 8,075,251 B2 * | 12/2011 | Purdey | F01D 11/04 277/423 |
| 2004/0046323 A1 * | 3/2004 | McCutchan | F01D 11/02 277/409 |
| 2016/0273386 A1 * | 9/2016 | Sheridan | F01D 25/183 |

FOREIGN PATENT DOCUMENTS

| GB | 848601 A | 9/1960 |
| GB | 2 125 118 A | 2/1984 |
| JP | 2003-286806 A | 10/2003 |
| JP | 2005-147216 A | 6/2005 |
| WO | 2013/182306 A1 | 12/2013 |

OTHER PUBLICATIONS

Mar. 22, 2018 Search Report issued in Great Britain Patent Application No. GB1717431.9.
Apr. 26, 2019 Search Report issued in European Patent Application No. 18196643.3.

* cited by examiner

*Primary Examiner* — Nathan Cumar
(74) *Attorney, Agent, or Firm* — Oliff PLC

(57) ABSTRACT

A hydraulic seal arrangement for a rotating machine comprises an annular housing disposed around a shaft having an axis of rotation, the annular housing being relatively rotatable with respect to the shaft and having a sealing fluid zone within a radially outer portion of an interior of the annular housing. A fin extends radially from the shaft into the annular housing, with at least a portion of the fin extending radially into the sealing fluid zone. In use, the sealing fluid is centrifugally accelerated before being directly introduced into the sealing fluid zone by a sealing fluid inlet so as to generate a swirl component upon its introduction.

16 Claims, 4 Drawing Sheets

HYDRAULIC SEAL ARRANGEMENT

CROSS-REFERENCE TO RELATED APPLICATIONS

This specification is based upon and claims the benefit of priority from UK Patent Application Number GB1717431.9 filed on Oct. 24, 2017, the entire contents of which are incorporated herein by reference.

BACKGROUND

Field of the Disclosure

The present disclosure concerns a hydraulic seal arrangement. In particular, the present disclosure concerns a hydraulic seal arrangement for use in a rotating machine such as, for example, a gas turbine engine.

Description of the Related Art

In high-performance rotating machinery such as, for example, gas turbine engines, there is a requirement to achieve a seal in order to prevent the flow of a gas from a high-pressure source to a low-pressure sink. In some instances a degree of seal leakage may be tolerable and in such cases a labyrinth seal may provide an adequate solution. In some restrictive cases, where the seal leakage flow may be, for example combustible or toxic, a zero-leakage seal may be required. Hydraulic seals, which maintain a high density fluid seal between the high-pressure source and the low-pressure sink, using centrifugal force, may provide such a solution.

Hydraulic seals can rely, in order for their function, on the centrifugal force resulting from relative rotation between at least one seal element and an annular body which extends radially from the seal element. For this reason, hydraulic seals are suitable for use in applications comprising at least one rotating component. In particular, hydraulic seals can be used to prevent the flow of a working fluid, such as a gas or a gas-oil mist, between a high-pressure source and a low-pressure sink.

A typical hydraulic seal comprises a seal fin and a housing which are relatively rotatable. Thus, at least one of the seal fin and the housing rotates to impart sufficient swirl to a relatively dense sealing fluid provided into the seal in order to prevent it from draining out of the seal under the action of gravity. If a sufficient degree of swirl is imparted to the sealing fluid through interaction with the rotating seal fin or housing, it will not only be retained within the seal under the action of centrifugal force, but it will also be able to sustain a pressure differential across seal, without flowing from the high-pressure source to the low-pressure sink. Thus, for the effective functioning of the seal, the centrifugal force imparted to the rotating sealing fluid is in excess of the forces required to overcome the effects of gravity and a respective pressure differential.

According to known hydraulic seal arrangements, a steady flow of sealing fluid is discharged into the seal housing from the high-pressure side of the seal. The flow of sealing fluid weirs off the low-pressure side of the seal before being collected by a scavenge arrangement. The high-pressure sealing fluid jet replenishes the sealing fluid captive in the hydraulic seal, but makes no direct contribution to the performance of the seal or the pressure differential sustained by it.

The seal fin and housing form an integral part of an assembly having significant inertia. Consequently, a period of time will elapse during start-up in which the rotational speed of the seal elements will be below the threshold level at which the seal functions as intended. Therein, the centrifugal force imparted to the rotating sealing fluid is not in excess of the forces required to overcome the effects of gravity and the respective pressure differential and an effective seal cannot be maintained. Throughout this start-up period the potential will exist for a working fluid resident in the high-pressure source to leak through the seal and reach or accumulate in the low-pressure sink. In applications where zero/minimal seal leakage is a design requirement, the design intent would be compromised to some degree by a traditional hydraulic seal. In addition, there is a limit to the pressure differential that can be sustained by a traditional hydraulic seal of given dimensions, operating at a given rotational speed. In order to accommodate larger pressure differentials, designers face the choice of increasing the dimensions of the seal, adding weight and/or cost, or operating the seal at a higher rotational speed, which adds complexity and impacts on the operability and design of further system components.

The delivery of a sealing fluid into the hydraulic seal via a linear high-pressure jet results in windage, as the sealing fluid enters the seal with little or no swirl velocity component. Therein, the sealing fluid must be accelerated up to the bulk rotational speed of the fluid present within the fin and housing assembly. This presents a number of detrimental effects to the overall efficiency of the rotating machine, notably including that the additional windage detracts from overall machine efficiency, increasing running costs. Furthermore, the work done on the sealing fluid increases the temperature of the fluid, potentially reducing its useful life. As a result, the increase in sealing fluid temperature, due to the work done on it, must be offset by an increase in sealing fluid delivery rate.

The increase in seal fluid flow referred to above reduces the bulk rotational speed of the fluid within the seal, resulting in a corresponding reduction in the pressure differential that can be sustained.

In the application of hydraulic seals within for example, gas turbine engines and other prime mover applications, the high-pressure delivery of sealing fluid into the hydraulic seal contributes to parasitic losses that erode thermal performance of the engine. Furthermore, in applications where the seal fin and housing rotate in opposite directions the bulk rotation within the seal is low. Thus, the elapsed time for the seal to be satisfactorily made will be significantly increased and the pressure differential that the seal can sustain will be greatly reduced.

For the above reason at least, there exists a need to provide a hydraulic seal arrangement which does not suffer from the afore-mentioned disadvantages.

SUMMARY

According to a first aspect there is provided a hydraulic seal arrangement for a rotating machine, the hydraulic seal arrangement comprising an annular housing around a shaft having an axis of rotation, the shaft and the annular housing being relatively rotatable; the annular housing further comprising a sealing fluid zone at a radially outer portion of the housing; a fin extending radially from the shaft into the annular housing, at least a portion of the fin extending radially into the sealing fluid zone; wherein sealing fluid is centrifugally accelerated, in use, before being directly introduced into the sealing fluid zone by a sealing fluid inlet, to generate a swirl component upon introduction therein.

Advantageously, the hydraulic seal arrangement may reduce the start-up period. Thus, the time required to form the seal during start-up is reduced over traditional hydraulic seals. Through the arrangement, the sealing liquid may be delivered in a highly swirled state and does not rely solely upon angular momentum being imparted to the sealing liquid from the rotating seal elements. Such rapid formation of the seal may result in reduced seal leakage during start up over traditional hydraulic seals. Moreover, by forming the seal before the seal pressure differential is applied, such leakage may be avoided completely. The bulk rotation of the sealing liquid may also be increased due to its swirled delivery state, rather than the unswirled axial delivery adopted in traditional seals. Thus, for a given seal geometry and rotational speed, the arrangement may sustain higher pressure differentials than traditional hydraulic seals.

Sealing fluid may exit the inlet with a circumferential velocity or tangential speed which is at least substantially equivalent to either or both of the circumferential velocity or tangential speed of the sealing fluid inlet. Thus, sealing fluid may be circumferentially or centrifugally accelerated, in use, to a circumferential velocity or tangential speed which is at least substantially equivalent to either or both of the circumferential velocity or tangential speed of the sealing fluid inlet, before being directly introduced into the sealing fluid zone by the sealing fluid inlet. The sealing fluid inlet may be configured to generate a swirl component within the sealing fluid zone upon introduction of the sealing fluid therein. Thus, the sealing fluid inlet may be configured such that the passing of the sealing fluid through the sealing fluid inlet into the sealing fluid zone generates a swirl component within the sealing fluid zone. Thus, in some examples, the sealing fluid inlet may be one or more of angled, orientated, or directed in a direction which is canted away from the radial direction perpendicular to the axis of rotation of the shaft. The sealing fluid inlet may be canted away from the radial direction in either or both of a circumferential direction or an axial direction relative to the axis of rotation of the shaft. The sealing fluid inlet may be canted away from the radial direction in a clockwise or anti-clockwise circumferential direction. Additionally or alternatively, the sealing fluid inlet may be canted away from the radial direction in an upstream or downstream axial direction relative to the axis of rotation of the shaft and the air flow being directed through the gas turbine engine, during use.

The fin may be a projection extending from an attached end affixed to the shaft to a free end. The projection may be extend circumferentially around the shaft. The projection may be a full annulus around the shaft. The fin may be a plate-like member having a radial depth and axial thickness in relation to the rotational axis of the shaft. The projection may be rectangular in a lateral section having a major axis and a minor axis. The major axis may be radial; the minor axis may be axial. The projection may be integrally formed with the shaft, for example machined in a surface of the shaft, or separately formed and joined thereafter. The method of joining the projection to the shaft may be any suitable method, for example, welding, brazing. Alternatively, the method of joining the projection to the shaft may be achieved by, for example, mechanical joining or fastening of the projection to the shaft.

The sealing fluid inlet may be configured within the fin. The inlet may be provided at the terminal end of a fluid passageway located within the fin. The fluid passageway may extend radially within the fin. The passageway may be provided by one or more circumferentially extending slots within the fin or by a circumferential distribution of radially extending elongate passageways. The fluid passageways may be connected to a supply channel towards a radially inner end thereof. The supply channel may be located within the shaft. The supply channel may be provided by one or more passageways within the shaft. The one or more supply passageways may extend along a longitudinal axis of the shaft. The supply channel may be provided with a supply of oil. The supply of oil may be pressurised. The supply of oil may be controlled so as to alter the pressure or flow rate of oil delivered by the inlets to the seal. Advantageously, incorporation of the fluid inlet within the fin ensures that fluid exiting the fluid inlet has been circumferentially accelerated to a tangential speed of the fluid inlet prior to application of the fluid into the sealing fluid zone.

The sealing fluid inlet may be configured at a radially outer portion of the fin. Advantageously, the fluid may be discharged into the sealing fluid zone from the portion of the fin with the highest tangential velocity, meaning that a large swirl component is achieved.

The sealing fluid inlet may be configured within the annular housing. Advantageously, where the annular housing rotates, incorporation of the fluid inlet within the annular housing ensures that fluid exiting the fluid inlet has been circumferentially accelerated to a tangential speed of the annular housing prior to application of the fluid into the sealing fluid zone. The incorporation of the fluid inlet within the annular housing may be provided in addition to, or in an alternative arrangement to the sealing fluid inlet being configured within the fin.

The annular housing and fin may co-rotate. Advantageously, co-rotation may give rise to an increased swirl component due to a greater surface area of rotating components, the greater surface area enabling a greater frictional effect and hence the ability to maintain a higher volume of swirl.

The housing and fin may contra-rotate. Advantageously, the arrangement does not rely solely upon the rotation of the seal fin or annular housing to impart swirl to the sealing fluid. Thus, due to the sealing fluid being circumferentially accelerated to a tangential speed of the fluid inlet to induce swirl, the arrangement could be used in either static or contra-rotating systems.

The discharge of the sealing fluid from the sealing fluid inlet may be in a direction having either or both of a radial or an axial component relative to the axis of rotation of the shaft. Advantageously, angling the sealing fluid inlet, and hence the discharge of sealing fluid into the sealing fluid zone, may increase the swirl imparted to the sealing fluid zone by the sealing fluid.

The discharge of the sealing fluid from the sealing fluid inlet may be angled in a direction of either or both of the rotation of the fin or the rotation of the housing. In this way, the tangential velocity of the sealing fluid entering the sealing fluid zone may be increased. In particular, angling the sealing fluid inlet, and hence the discharge of sealing fluid in this way could further increase the swirl imparted to the sealing fluid zone by the sealing fluid.

The sealing fluid may be introduced into the sealing fluid zone at an angle of between about 5 and about 90 degrees from the radial direction. The sealing fluid may be introduced into the sealing fluid zone at an angle of between about 45 and about 90 degrees from the radial direction. The sealing fluid may be introduced into the sealing fluid zone at an angle of between about 70 and about 75 degrees from the radial direction.

The sealing fluid may be introduced into the sealing fluid zone at a relative exit velocity which exceeds a rotational velocity of the fin. The sealing fluid may be introduced into the sealing fluid zone at a relative exit velocity which exceeds a rotational velocity of the housing. In this way, the tangential velocity of the sealing fluid entering the sealing fluid zone may be increased. In particular, angling the sealing fluid inlet, and hence the discharge of sealing fluid in this way could further increase the swirl imparted to the sealing fluid zone by the sealing fluid.

The arrangement may comprise a plurality of fluid inlets. Advantageously, providing a plurality of fluid inlets may increase the volume of fluid which may be supplied into the sealing fluid zone over a given time period. In this way, the time taken to form the seal may be reduced, whilst additionally providing reduced seal leakage during start up over traditional hydraulic seals.

The arrangement may comprise a sensor to sense an operating condition of at least a part of the apparatus, the sensor being configured to transmit a signal for the sensed operating condition. The arrangement may comprise a controller to receive a signal for the sensed operating condition and control the delivery of the sealing fluid into the sealing fluid zone. Advantageously, through control of the sealing fluid input into the sealing fluid zone, a varying seal pressure differential to be matched by an active control system, may be achieved. Thus, the hydraulic seal arrangement may provide the ability to increase, decrease and/or actively manage the pressure drop that can be sustained by the seal. In this way, the sensing and/or control of one or more operating conditions allows the ability to match a targeted or pre-selected seal pressure differential, and thereby control the leakage past the seal in a system with a constant rotational speed. In this way, the seal liquid delivery rate may be adjusted and actively managed to match the desired variation in seal pressure differential.

According to a second aspect there is provided a method of controlling leakage through the hydraulic seal arrangement, the method comprising steps to determine an operating condition of the seal arrangement; provide the operating condition of the seal arrangement to a control device, the control device being configured to determine an offset between the operating condition of the seal arrangement and a predetermined operating condition; determine an operating instruction according to the determined offset, the operating instruction providing a quantity, location or rate of delivery of sealing fluid to be delivered to the sealing fluid zone; and, provide a quantity of sealing fluid to the sealing fluid zone, according to the operating instruction, to reduce the offset between the operating condition of the seal arrangement and the predetermined condition.

Advantageously, the arrangement provides a method for varying seal pressure differential according to a preferred or operational model value. Thus, the hydraulic seal arrangement, and active control of the arrangement in conjunction with feedback control and controllable fluid delivery, may provide the ability to increase, decrease and/or actively manage the pressure drop that can be sustained by the seal. In this way, the sensing and/or control of one or more operating conditions allows the ability to match a targeted or predetermined seal pressure differential, and thereby control the leakage past the seal in a system with a constant rotational speed. In this way, the seal liquid delivery rate may be adjusted and actively managed to match the desired variation in seal pressure differential. Thus, the delivery of the fluid may be remotely controlled. The system may include a pump for delivering sealing fluid to the sealing fluid zone. The pump may be controllable so as to vary quantity, location or rate of delivery of sealing fluid to be delivered to the sealing fluid zone.

In this way, the system could be used as a threshold detection system. In this way, the point at which a seal can no longer be sustained could be used to indicate that an upper pressure differential threshold had been reached; a lower rotational speed threshold had been reached; or a lower seal liquid flow rate threshold had been reached.

According to a third aspect, there is provided a hydraulic seal arrangement for a rotating machine, the hydraulic seal arrangement comprising an annular housing around a shaft having an axis of rotation, the shaft and the annular housing being relatively rotatable; the annular housing further comprising a sealing fluid zone at a radially outer portion of the housing; a fin extending radially from the shaft into the annular housing, at least a portion of the fin extending radially into the sealing fluid zone; wherein sealing fluid is centrifugally accelerated, in use, to a circumferential velocity or tangential speed which is at least substantially equivalent to either or both of the circumferential velocity or tangential speed of the sealing fluid inlet, before being directly introduced into the sealing fluid zone by a sealing fluid inlet configured to generate a swirl component within the sealing fluid zone upon introduction of the sealing fluid therein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
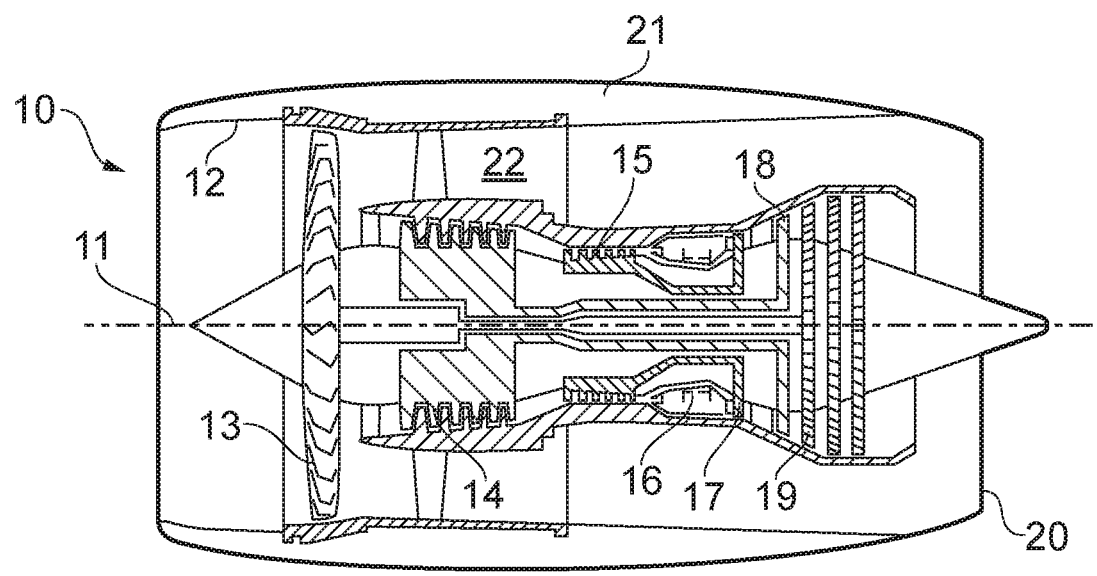
FIG. 1 is a sectional side view of a gas turbine engine known within the art.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be appreciated that the rotational components briefly described in relation to FIG. 1 may each define a separation between two regions of disparate temperatures, materials or pressures within the internal region of the gas turbine engine 10, with such regions needing to be sealed from one another. To maintain a high density fluid seal between a high-pressure source and a low-pressure sink, using centrifugal force, may provide such a solution.

Figure 2:
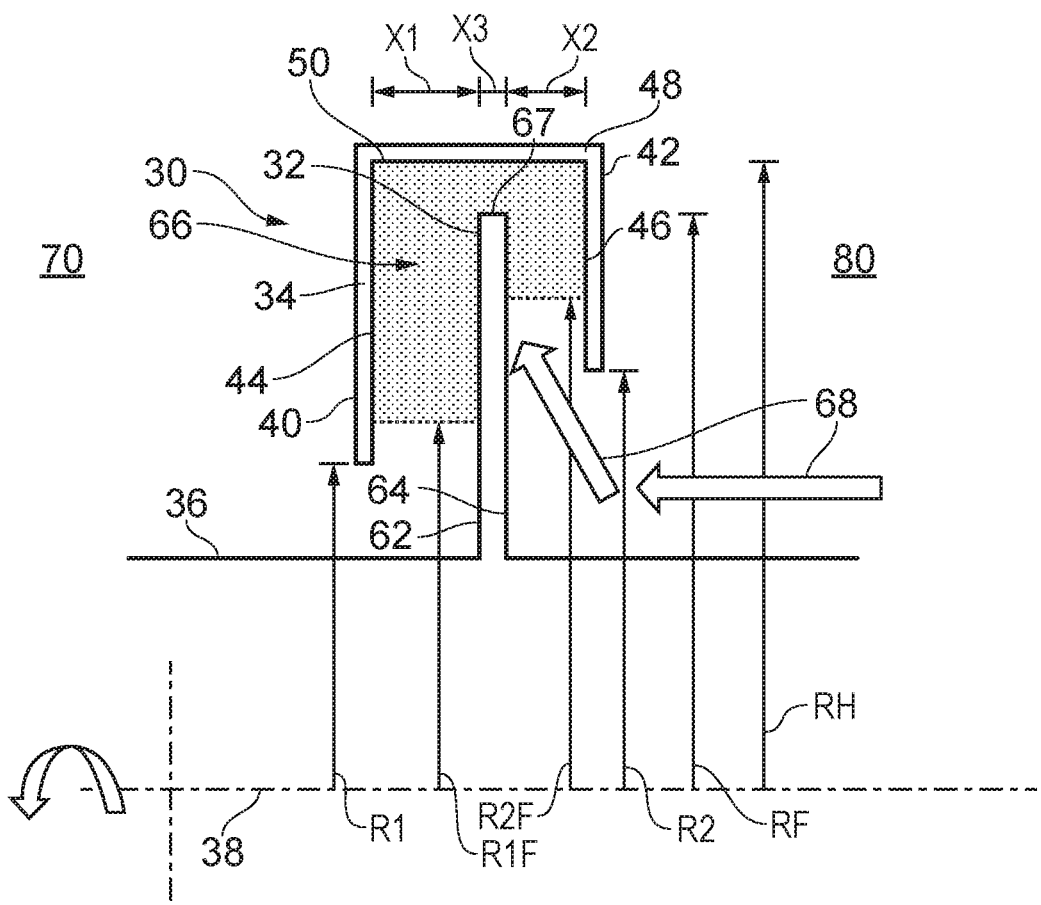
FIG. 2 is a cross-sectional view of a hydraulic seal known within the art.

FIG. 2 shows a cross sectional view of a hydraulic seal 30 known in the art, the hydraulic seal 30 comprising a seal fin 32 and an annular housing 34. The annular housing 34 circumferentially extends around a shaft 36, the shaft 36 being free to rotate about an axis of rotation 38. In this way, the shaft 36 may rotate relative to the housing 34.

The annular housing 34 comprises a first 40 and a second 42 axially displaced side wall, each side wall 40,42 comprising an inner-facing surface 44,46, both side walls 40,42 extending radially from a location radially displaced from the shaft 36. In some examples, the radial component represents an axis extending substantially perpendicularly to an axis of rotation 38 of the shaft 36. In the example shown, each of the side walls 40,42 of the annular housing 34 are disparately spaced from the axis of rotation 38 of the shaft 36, the first side wall 40 having a first spacing R1 and the second wall 42 having a second spacing R2. The annular housing 34 also comprises a top wall 48 having an inner face 50, the inner face 50 being radially spaced from the axis of rotation 38 of the shaft 36 at a distance RH. In addition, the top wall 48 extends axially between, and is connected to, the first 40 and second 42 side walls to define a sealing fluid zone 66. The sealing fluid zone 66 is located radially outwards of R1 and R2, and between the respective side walls 40,42 forming the housing 34.

The shaft 36 additionally comprises a seal fin 32 having a first 62 and second 64 outer-facing surface, the radially outermost portion of the seal fin 32, hereinafter known as the tip 67. Therein, the seal fin 32 extends radially from the shaft 36 into the annular housing 34 to a distance from the axis of rotation 38 of the shaft 36 RF. The extension of the seal fin 32 into a region between the first 40 and second 42 side walls provides a radial displacement between the tip 67 and the inner face 50 of the top wall 48 of RH-RF. As shown, the seal fin 32 has axial spacings X1,X2 between the inner-facing surfaces 44,46 of the first and second side walls 40,42. In this way, the seal fin 32 extends from the axis of rotation 38 of the shaft 36 into the sealing fluid zone 66 to a displacement RF, which is radially outwards of the innermost portion of the first 40 and second 42 side walls of the annular housing 34.

A sealing fluid 68 is shown to be directed towards the seal fin 32 before entering the sealing fluid zone 66 via the axial spacing X2 between second outer-facing surface 64 of the seal fin 32 and the inner-facing surface 46 of the second 42 axially displaced side wall. In the example shown, the sealing fluid 68 interacts with the outer-facing surface 64 of the seal fin 32 before entering the sealing fluid zone 66 via axial spacing X2. As the seal fin 32 rotates relative to the housing 34, the sealing fluid 68 is one or more of circumferentially, tangentially, and centrifugally accelerated via frictional interaction with the rotating seal fin 32. Additionally or alternatively, the sealing fluid 68 may be one or more of circumferentially, tangentially, and centrifugally accelerated via frictional interaction with a working fluid boundary layer adjacent the rotating seal fin 32. The circumferential acceleration of the sealing fluid 68 imparts a swirl component to the sealing fluid 68. The swirl component is sufficient to provide a centrifugal acceleration of the sealing fluid 68 relative to the axis of rotation 38 of the shaft 36. The centrifugal acceleration of the sealing fluid 68 is sufficient to prevent the sealing fluid 68 from draining out of the sealing fluid zone 66 under the action of gravity. Therein, the swirl component is representative of either or both of the quantity and the tangential speed of the sealing fluid 68, within the sealing fluid zone 66, circumferentially rotating about the axis of rotation 38 of the shaft 36.

Owing to the relative rotation of the shaft 36 and the annular housing 34, and the associated centrifugal effects acting on the sealing fluid 68 upon entry into the sealing fluid zone 66, the sealing fluid 68 collects in the sealing fluid zone 66 in both the axial spacing X1, between first outer-facing surface 62 of the seal fin 32 and the inner-facing surface 44 of the first 40 axially displaced side wall, and X2. Thus, a hydraulic seal is formed between the annular housing 34, the seal fin 32, and the sealing fluid 68 contained within the sealing fluid zone 66.

During operation, a working fluid zone of relatively low pressure 70 is located on the left-hand side of the hydraulic seal arrangement 30. Conversely, a working fluid zone having a higher pressure than the low-pressure zone 80 is located on the right-hand side of the hydraulic seal 30. The hydraulic seal 30 prevents a working fluid 70,80 from traversing between regions either side of the hydraulic seal 30. The sealing fluid 68 will not only be retained within the seal 30 under the action of centrifugal force, but it will also be able to sustain a pressure differential across the seal 30, without flowing from the high-pressure source 80 to the low-pressure sink 70. Thus, the centrifugal forces imparted to the rotating sealing fluid contained in the sealing fluid zone 66 are in excess of the forces required to overcome the effects of gravity and the respective pressure differential. In FIG. 2, the differential pressures acting on the sealing fluid 68 contained in the sealing fluid zone 66 cause the respective radial offsets of the fluid 68 relative to the shaft 36 to vary on either side of the seal fin 32. In this way, the height of the fluid 68, relative to the axis of rotation 38, of the on the working fluid zone of relatively low pressure 70 is R1F, and the height of the fluid 68, relative to the axis of rotation 38, on the working fluid zone having a higher pressure than the low-pressure zone 80 is R2F. It will be appreciated that the radial offsets of the sealing fluid 68 contained in the sealing fluid zone 66, relative to the axis of rotation 38 of the shaft 36, may vary according to the pressure differential between the lower pressure 70 and higher pressure 80 zone acting across the sealing arrangement 30.

Figure 3A:
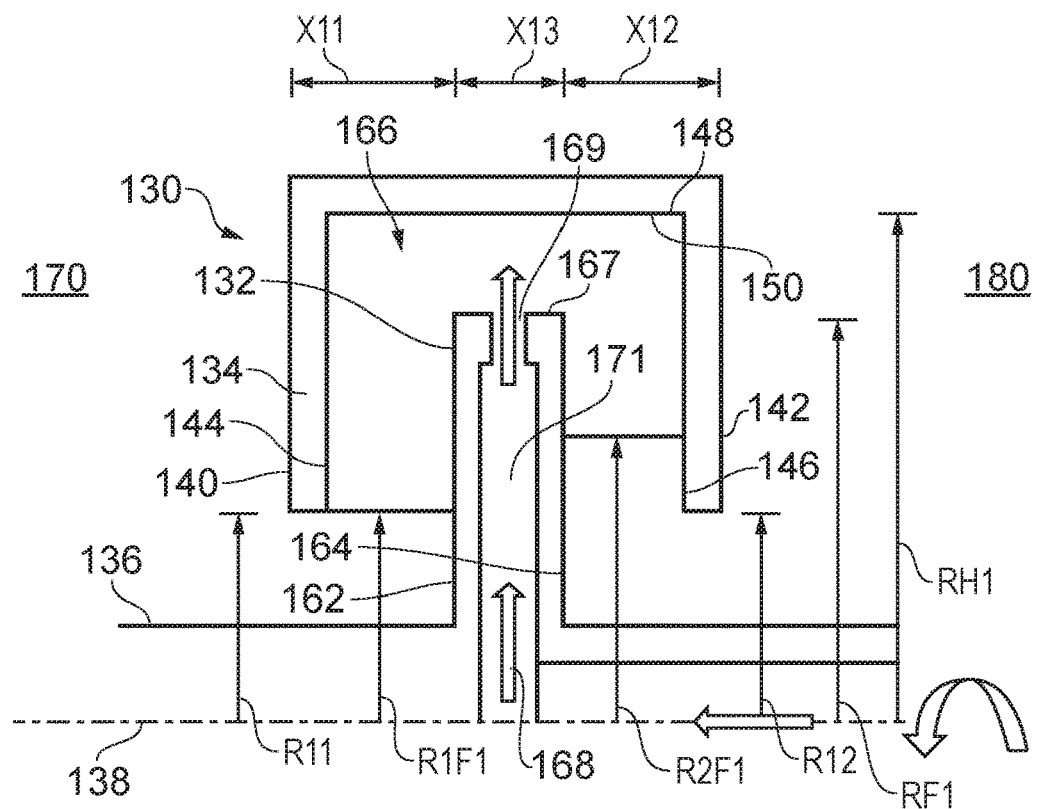
FIG. 3a is a perspective view of a hydraulic seal according to examples of the present disclosure.

FIG. 3a shows a cross sectional view of a hydraulic seal 130, the hydraulic seal 130 comprising a seal fin 132 and an annular housing 134. The annular housing 134 circumferentially extends around a shaft 136, the shaft 136 being free to rotate about an axis of rotation 138. The shaft 136 and the annular housing 134 are relatively rotatable. In some examples the shaft 136 may rotate relative to the housing 134. Alternatively, the housing 134 may rotate relative to the shaft 136. Further alternatively, both the housing 134 and the shaft 136 may rotate, such that the shaft 136 may co-rotate or contra-rotate with the housing 134.

Figure 3B:
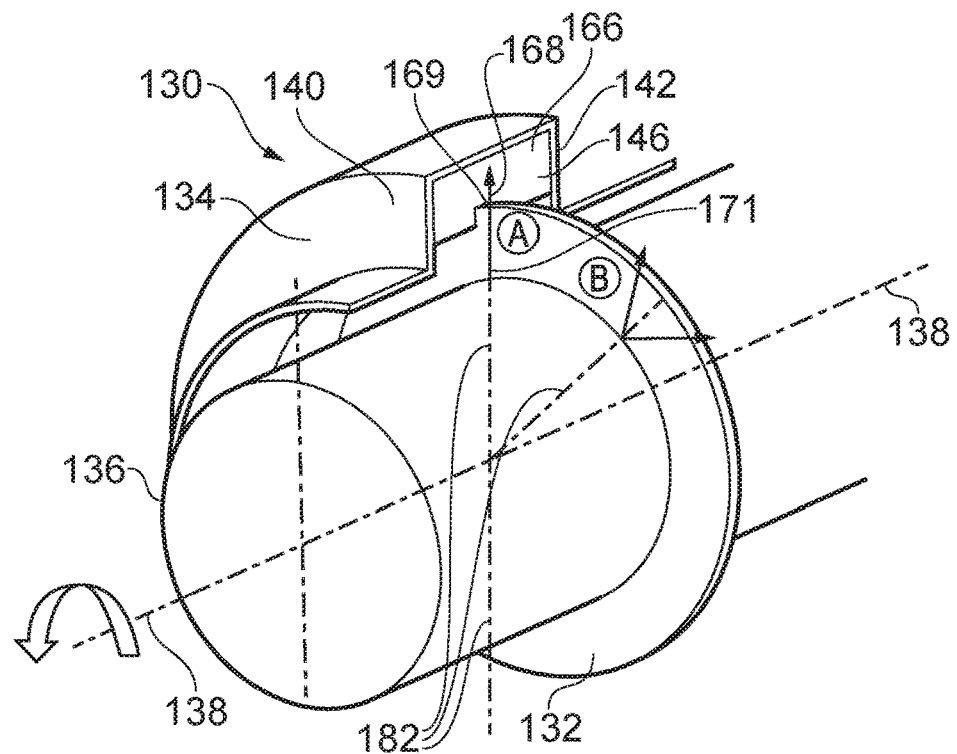
FIG. 3b is a perspective view of a hydraulic seal according to examples of the present disclosure.

The annular housing 134 comprises a first and a second axially displaced side wall, each side wall 140,142 comprising an inner-facing surface 144,146, both side walls 140,142 extending radially from the axis of rotation 138 of the shaft 136. In some examples, the radial component 182, shown in FIG. 3b, represents an axis extending substantially perpendicularly to an axis of rotation 138 of the shaft 136. In the example shown, each of the side walls 140,142 of the annular housing 134 are equally spaced from the axis of rotation 138 of the shaft 136 by a radial separation, the first side wall 140 having a first spacing R11 and the second wall 142 having a second spacing R12. In further examples, each of the side walls 140,142 of the annular housing 134 may be disparately spaced from the axis of rotation 138 of the shaft 136. The annular housing 134 also comprises a top wall 148 having an inner face 150, the inner face 150 being radially spaced from the axis of rotation 138 of the shaft 136 at a distance RH1. In addition, the top wall 148 extends axially between, and is connected to, the first 140 and second 142 side walls to define a sealing fluid zone 166. The sealing fluid zone 166 is located radially outwards of R11 and R12, and the respective side walls 140,142 forming the housing 134

The shaft 136 additionally comprises a seal fin 132 having a first 162 and second 164 outer-facing surface, the radially outermost portion of the seal fin 132, hereinafter known as the tip 167. Therein, the seal fin 132 generally extends radially from the shaft 136 into the annular housing 134 to a distance RF1 from the axis of rotation 138 of the shaft. The extension of the seal fin 132 into a region between the first 140 and second 142 side walls provides a radial displacement between the tip 167 and the inner face 150 of the top wall 148 of RH1-RF1. As shown, the seal fin 132 has axial spacings X11,X12 between the inner-facing surfaces 144, 146 of the first and second side walls 140,142. In this way, the seal fin 132 extends from the axis of rotation 138 of the shaft 136 into the sealing fluid zone 166 to a displacement RF1, which is radially outwards of the innermost portion of the first 140 and second 142 side walls of the annular housing 134.

It will be appreciated that the seal fin 132 shown is in the form of an annular, circumferentially extending rib which is connected to and extends radially from the shaft 136. The seal fin 132 shown is of uniform diameter. In further examples, the seal fin 132 shown may be of non-uniform diameter or geometry and may comprise one or more sloping faces. In this way, it will be appreciated the annular, circumferentially extending seal fin 132 may be formed of any appreciable cross-sectional shape or configuration whilst being connected to and extending radially from the shaft 136, extending radially over distance RF1 from the axis of rotation 138 of the shaft 136.

The seal fin 132 is shown to have a seal fin 132 breadth X13, the tip of the seal fin 132 being located between the first 162 and second 164 outer-facing surface. The seal fin 132 comprises a sealing fluid inlet 169 at the tip 167 of the seal fin 132. In order to provide a sealing fluid 168 to the sealing fluid zone 166 via the sealing fluid inlet 167, the seal fin 132 comprises a channel 171 extending substantially radially, along an axis extending approximately perpendicularly to an axis of rotation 138 of the shaft 136, within the body of the seal fin 132. The channel 171 fluidly connects the sealing fluid inlet 169 to a sealing fluid reservoir or source (not shown). In this way, the sealing fluid 168 is supplied through the sealing fluid inlet 169 at the tip of the seal fin 132 to the sealing fluid zone 166. Thus, the channel 171 provides access to an annular plenum formed within the seal fin 132, the channel 171 extending to the tip 167 to deliver the sealing liquid 168 into the sealing fluid zone 166 with a high velocity swirl component. In some examples, the inlet 167 may be provided at a terminal end of a fluid passageway located within the seal fin 132. The fluid passageways may be connected to a supply channel towards a radially inner end thereof. Thus, the fluid passageway may extend radially within the fin.

In the example shown, the seal fin 132 rotates relative to the housing 134 to impart a sufficient swirl to the sealing fluid 168 required to prevent it from draining out of the seal 130 under the action of gravity. Therein, the swirl component is representative of either or both of the quantity and tangential speed of the sealing fluid 168, within the sealing fluid zone 166, circumferentially rotating about the axis of rotation 138 of the shaft 136. In this way, a given portion of sealing fluid 168 interacts with the outer-facing surface 162,164 of the rotating seal fin 132 following both entry and centrifugal acceleration of the portion of sealing fluid 168 into the sealing fluid zone 166 only. Frictional interaction between one or more of the outer-facing surface 162,164 of the rotating seal fin 132, a working fluid boundary layer adjacent the outer-facing surface 162,164 of the rotating seal fin 132, and the sealing fluid 168 maintains the swirl component within the sealing fluid 168. However, the outer-facing surface 162,164 of the rotating seal fin 132, and working fluid boundary layer adjacent the outer-facing surface 162,164 of the rotating seal fin 132 are not responsible for bulk circumferential or tangential speed, and hence centrifugal acceleration of the sealing fluid 168 before entry into the sealing fluid zone 166. Swirl is primarily induced by the fluid being delivered into the sealing fluid zone 166 via the rotating seal fin 132. Additionally or alternatively, frictional interaction between one or more of the inner-facing surfaces 144,146,150 of the annular housing 134, a working fluid boundary layer adjacent the inner-facing surfaces 144, 146,150 of the annular housing 134, and the sealing fluid 168 can maintain the swirl component within the sealing fluid 168 in an identical manner. Thus, the sealing fluid 168 exits the rotating seal fin 132 with the circumferential velocity, at least a substantially equivalent circumferential velocity, of the radially outer position of the sealing fluid inlet 169. In this way, the fluid 168 need not be directly accelerated by interaction of the seal fin 132 with the sealing fluid 168 upon entry into the sealing fluid zone 166.

Owing to either or both of tangential speed and centrifugal acceleration of the sealing fluid 168 within the sealing fluid channel 171 and/or inlet 169, the sealing fluid 168 collects in the sealing fluid zone on both the left-hand and the right-hand side of the seal fin 132 upon entry into the sealing fluid zone 166. Thus, a hydraulic seal 130 is formed between the annular housing 134, the seal fin 132, and the sealing fluid 168 contained within the sealing fluid zone 166, as shown in FIG. 3a. During operation, a working fluid zone of relatively low pressure 170 is located on the left-hand side of the hydraulic seal arrangement 130. Conversely, a working fluid zone having a higher pressure than the low-pressure zone 180 is located on the right-hand side of the hydraulic seal 130. As described in relation to FIG. 2, the radial offsets R1F1 and R2F1 of the fluid relative to the shaft 136 vary according to the pressure differential between the lower pressure and higher pressure zone acting across the sealing arrangement 130.

FIG. 3b shows a cut-away schematic view of the sealing arrangement 130 previously discussed in relation to FIG. 3a. The numbering used in relation to the features of FIG. 3a is consequently identical to that of FIG. 3b. In particular, FIG. 3a shows the axis of rotation 138 of the shaft 136 and the radial component 182 of the shaft 136 and sealing arrangement 130. Thus. the seal fin 132 is shown to extend radially, so as to extend substantially perpendicularly from the axis of rotation 138 of the shaft 136, into the annular housing 134. Thus, the seal fin 132 extends to a location between the first and second axially displaced side walls 140,142 to provide a radial displacement between the tip 167 of the seal fin 132 and the inner face 150 of the top wall 148.

The seal fin 132 is shown to comprise the sealing fluid inlet 169 at the tip of the seal fin 132. In order to provide sealing fluid 168 to the sealing fluid zone 166 via the sealing fluid inlet 169, the seal fin 132 comprises a channel 171 extending radially within the body of the seal fin 132. The channel 171 fluidly connects the sealing fluid inlet 169 to a sealing fluid reservoir or source (not shown). In this way, the sealing fluid 168 is supplied through the sealing fluid inlet 169 at the tip of the seal fin 132 to the sealing fluid zone 166. FIG. 3b shows two examples of such sealing fluid inlets at the tip of the seal fin 132. According to the first example A, both the sealing fluid channel 171 and inlet 169 are aligned to direct sealing fluid in a radial direction perpendicular to the rotational axis 138 of the shaft 136. According to the second example B, both the sealing fluid channel 171 and inlet 169 are aligned and angled to direct the sealing fluid 168 away from the radial direction 182, within a radial plane perpendicular to the rotational axis 138 of the shaft 136. According to further examples, the sealing fluid channel 171 or inlet 169 can be angled to direct sealing fluid 168 away from either or both of the radial 182 direction and a direction perpendicular to the axis 138 of rotation of the shaft 136. In a yet further example, the sealing fluid channel 171 can be aligned with the radial direction 182 of the shaft 136, wherein the inlet 169 is angled away from the radial direction 182, the inlet 169 directing sealing fluid 168 in a direction angled away from either or both of the radial 182 direction and a direction relative to the axis 138 of rotation of the shaft 136.

The angled discharge of sealing fluid 168 from the seal fin 132 advantageously aids in the formation of a pre-swirled delivery that may exceed a rotational speed of the seal fin 132 from which it is delivered. A pre-swirl fluid channel 171 and inlet 169 may be angled at about 15-90° from the radial direction. Alternatively, the pre-swirl fluid channel 171 and inlet 169 may be angled at about 40-90° from the radial direction. Further alternatively, the pre-swirl fluid channel 171 and inlet 169 may be angled at about 70-75° from the radial direction. Such an angle may generate a significant additional swirl component relative to the rotational speed of the seal element from which the sealing liquid 168 is delivered. By this means, the bulk swirl achieved in the swirl is increased, resulting in a corresponding increase in the pressure differential that may be sustained by the seal 130. In the case of an incompressible sealing fluid 168, where the sonic velocity is circa 1500 m/s, significant increases in swirl velocity may be achieved in this way.

Figure 4A:
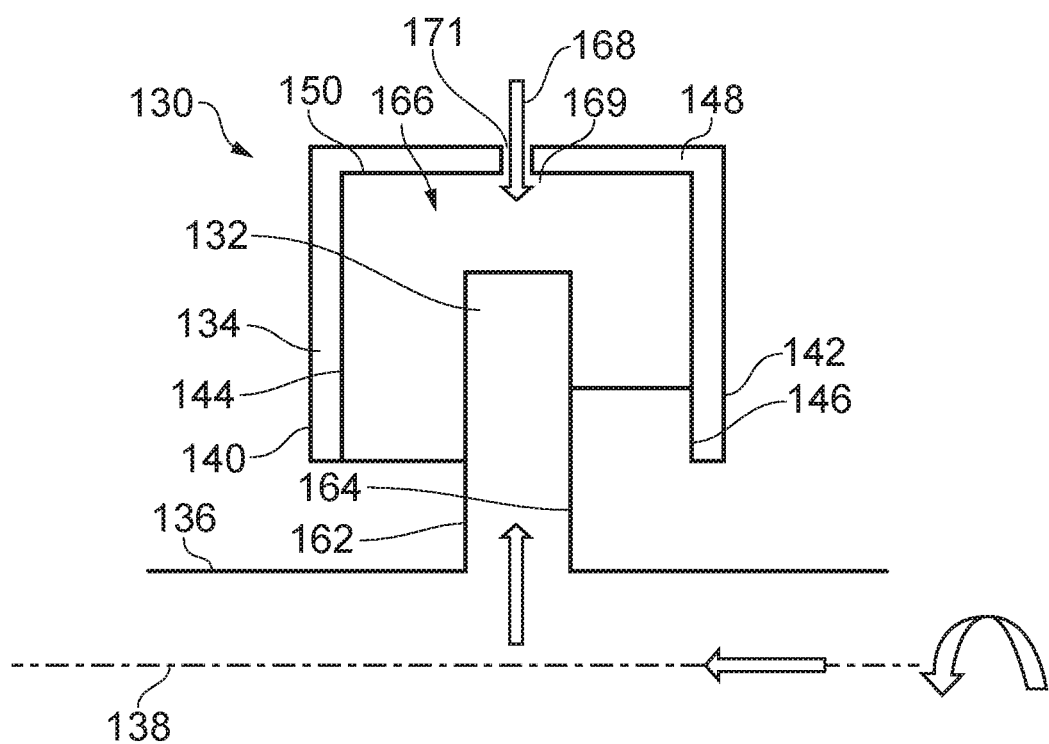
FIG. 4a is a cross-sectional view of a hydraulic seal according to examples of the present disclosure; and, FIG. 4b is a perspective view of a hydraulic seal according to examples of the present disclosure.

FIG. 4a shows an alternative arrangement to that previously shown in FIG. 3a and FIG. 3b, the annular housing 134 comprising a sealing fluid inlet 169 within the top wall 148. In order to provide sealing fluid 168 to the sealing fluid zone 166 via the sealing fluid inlet 169, the annular housing 134 comprises a channel 171 extending generally radially within the body of the annular housing 134. The channel 171 fluidly connects the sealing fluid inlet 169 to a sealing fluid reservoir or source (not shown). In this way, the sealing fluid 168 is supplied through the sealing fluid inlet 169 within the body of the annular housing 134 to the sealing fluid zone 166.

In the example shown, the annular housing 134 rotates relative to the seal fin 132 to impart a sufficient swirl to the sealing fluid 168 to prevent it from draining out of the seal 130 under the action of gravity. In this way, a given portion of sealing fluid 168 interacts with a radially inner-facing surface 150 of the top wall 148 of the rotating housing 134 following both entry and centrifugal acceleration of the portion of sealing fluid 168 into the sealing fluid zone 166 only. Frictional interaction between one or more of the radially inner-facing surface 150 of the top wall 148 of the rotating housing 134, a working fluid boundary layer adjacent the radially inner-facing surface 150 of the top wall 148 of the rotating housing 134, and the sealing fluid 166 maintains the swirl component within the sealing fluid 168, but is not responsible for bulk circumferential and centrifugal acceleration of the sealing fluid 168 before entry into the sealing fluid zone 166. Swirl is primarily induced by the sealing fluid being delivered into the sealing fluid zone via the rotating housing 134. Additionally or alternatively, frictional interaction between one or more of the outer-facing surface 162,164 of the rotating seal fin 132, a working fluid boundary layer adjacent the outer-facing surface 162,164 of the rotating seal fin 132, and the sealing fluid 168 can maintain the swirl component within the sealing fluid 168 in a similar manner. Thus, the sealing fluid exits the rotating housing 134 with either the circumferential velocity, at least a substantially equivalent circumferential velocity, of the radially inner position of the sealing fluid inlet 169. In this way, the fluid 168 need not be directly accelerated by interaction of the rotating housing 134 with the sealing fluid 168 upon entry into the sealing fluid zone 166.

Owing to either or both of tangential speed and centrifugal acceleration of the sealing fluid 168 within the sealing fluid channel 171 and/or inlet 169, the sealing fluid 168 collects in the sealing fluid zone on both the left-hand and the right-hand side of the seal fin 132 upon entry into the sealing fluid zone 166. Thus, a hydraulic seal 130 is formed between the annular housing 134, the seal fin 132, and the sealing fluid 168 contained within the sealing fluid zone 166, as shown in FIGS. 3a and 4a. During operation, a working fluid zone of relatively low pressure 170 is located on the left-hand side of the hydraulic seal arrangement 130. Conversely, a working fluid zone having a higher pressure than the low-pressure zone 180 is located on the right-hand side of the hydraulic seal 130. As described in relation to FIG. 2, the radial offsets R1F1 and R2F1 of the fluid relative to the shaft 136 vary according to the pressure differential between the lower pressure and higher pressure zone acting across the sealing arrangement 130.

Figure 4B:
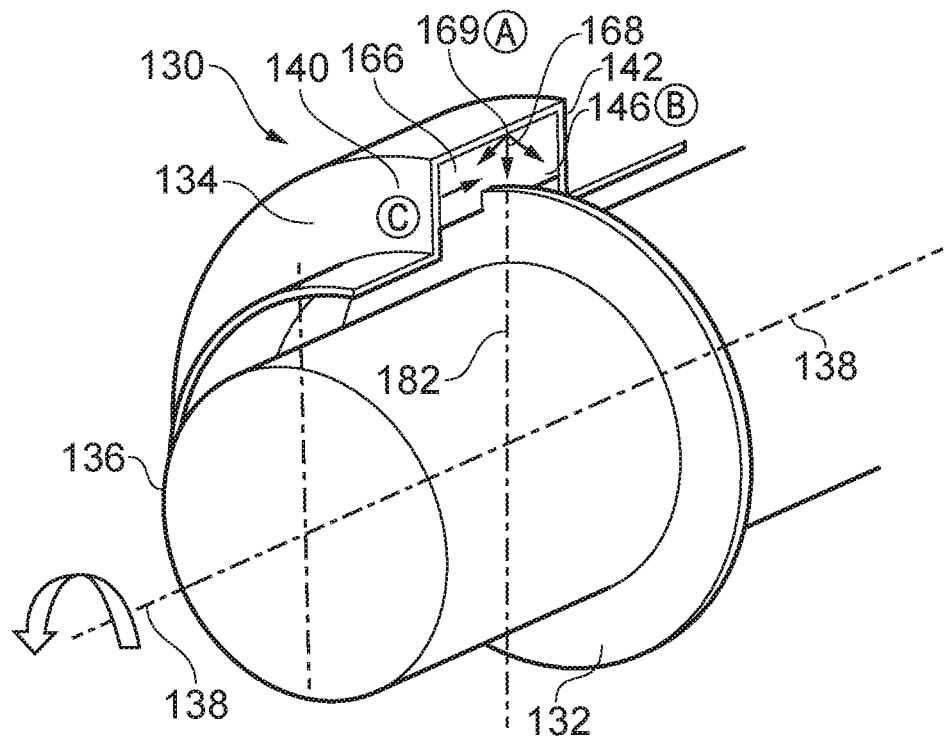

FIG. 4b shows a cut-away schematic view of the sealing arrangement 130 previously discussed in relation to FIG. 4a. The numbering used in relation to the features of FIG. 4a is consequently identical to that of FIG. 4b. In particular, FIG. 4b shows the axis of rotation 138 of the shaft 136 and the radial component 182 of the shaft 136 and sealing arrangement 130. Thus, the annular housing 134 is shown to extend radially, so as to extend substantially perpendicularly from the axis of rotation 138 of the shaft 136. Thus, the annular housing 134 is provided with a radial displacement between the radially inner-facing surface 150 of the top wall 148 of the rotating housing 134 and the axis of rotation 138 of the shaft 136.

The annular housing 134 is shown to comprise the sealing fluid inlet 169, the inlet being positioned on the radially inner-facing surface 150 of the top wall 148 of the rotating housing 134. In order to provide sealing fluid 168 to the sealing fluid zone 166 via the sealing fluid inlet 169, the annular housing 134 also comprises a channel 171 extending radially within the body of the annular housing 134. The channel 171 fluidly connects the sealing fluid inlet 169 to a sealing fluid reservoir or source (not shown). In this way, the sealing fluid 168 is supplied through the sealing fluid inlet 169 in the radially inner-facing surface 150 of the top wall 148 of the rotating housing 134 to the sealing fluid zone 166.

FIG. 4b shows three examples of such sealing fluid inlets on an inner-facing surface of the rotating housing 134. According to the example A, both the sealing fluid channel 171 and inlet 169 are aligned to direct sealing fluid 168 in a radial direction 182 perpendicular to the rotational axis 138 of the shaft 136. According to the example B, both the sealing fluid channel 171 and inlet 169 are aligned and angled to direct sealing fluid 168 away from the radial direction 182, within a radial plane perpendicular to the rotational axis 138 of the shaft 136. According to example C, the sealing fluid inlet 169 is provided in either or both of the first and a second axially displaced side wall 140,142. Thus, both the sealing fluid channel 171 and inlet 169 are aligned to direct sealing fluid 168 in an axial direction relative to the rotational axis 138 of the shaft 136. According to further examples, the sealing fluid channel 171 or inlet 169 can be angled to direct sealing fluid 168 away from either or both of the radial 182 direction and a direction perpendicular to the axis 138 of rotation of the shaft 136. In a yet further example, the sealing fluid channel 171 can be aligned with the radial direction 182 of the shaft 136, wherein the inlet 169 is angled away from the radial direction 182, the inlet 169 directing sealing fluid 168 in a direction angled away from either or both of the radial 182 direction and a direction relative to the axis 138 of rotation of the shaft 136.

In each of examples A, B and C, the respective configurations do not solely rely on angular momentum being transferred to the sealing fluid 168 by interaction between the sealing fluid 168 and the rotating seal elements within the working fluid zone 166. Thus, the configurations shown and described may reduce start-up time, reduce seal leakage during start up, and reduce efficiencies in energy transfer as the sealing fluid 168 is accelerated. Moreover, by forming the seal before the seal pressure differential is applied, such leakage may be avoided completely. The bulk rotation of the sealing fluid 168 may also be increased due to its swirled delivery state, rather than the unswirled axial delivery adopted in traditional seals. Thus, for a given seal geometry and rotational speed, the arrangement may sustain higher pressure differentials than traditional hydraulic seals. In example B in particular, by angling the inlet 169 such that the directed sealing fluid 168 acquires a tangential velocity component upon entering the working fluid zone 166, the sealing fluid 168 may be delivered into the working fluid zone 166 in a highly swirled state of increased tangential velocity relative to examples A and C, at least.

According to examples, the sealing fluid 168 has been shown and described as entering the seal 130 via a substantially radially 182 or axially 138 aligned inboard or outboard inlet 169. In further examples, both the seal fin 132 and the annular housing 134 can comprise sealing fluid inlets 169 described in relation to FIGS. 3a, 3b, 4a and 4b. Additionally or alternatively, either or of both the seal fin 132 and the annular housing 134 can comprise one of more inlets 169 arranged axially, circumferentially, or angled in the direction of the rotational axis 138 of the shaft 136 as required. In some examples, the inlets 169 could be axial, i.e. aligned with the axis of rotation 138, or any direction combining axial 138 and radial 182 components. Furthermore, a channel 171 may be provided for each sealing fluid inlet 169. Alternatively, a channel 171 may provide sealing fluid 168 to two or more sealing fluid inlets 169.

Referring to FIGS. 3a, 3b, 4a and 4b, the radial offsets RH1, R12 or R11 may vary according to either or both of the quantity of sealing fluid 168 released into the working fluid zone 166 and the pressure differentials across the hydraulic seal 130. As shown in FIGS. 3a, 3b, 4a and 4b, a quantity of sealing fluid 168 has been released into the working fluid zone 166, the quantity of sealing fluid 168 overcoming the depth R11 of the annular housing 134. Thus, the sealing fluid weirs off the low-pressure side 170 of the seal 130 before being collected by a scavenge arrangement (not shown). Additionally or alternatively, the sealing fluid may weir off the high-pressure side 180 of the seal 130 before being collected by a scavenge arrangement (not shown). In further examples, sealing fluid 168 may be fully contained within the annular housing 134.

In further examples, an intermittent or steady flow of sealing fluid 168 may be discharged into the annular housing 134 from the working fluid inlet 169. The inlet 167 shown in FIGS. 3a, 3b, 4a and 4b may be formed of an orifice or a plurality of orifices which allow fluid to be projected from the inlet 167 into the sealing fluid zone 166. It will be appreciated that the inlet 167 may be shaped by constricting or expanding the flow of sealing fluid 168 before the fluid is projected from the inlet 167 in order to alter flow shape or tangential velocity of the fluid flow. In some examples, the respective sides of the inlet 167 may remain parallel. In some examples, the respective sides of the inlet 167 may be sloped so as to diverge to an inlet diameter. In some examples, the respective sides of the inlet 167 may be sloped so as to converge to an inlet diameter. In some examples, the respective sides of the inlet 167 may be shaped so as to converge and/or diverge to an inlet diameter as required. In some examples, respective sides of the inlet 167 may be controllable to vary convergence and/or divergence as required In some examples, the fluid delivery system may be actively coupled to a system which senses the pressure differential to be sustained by the seal 130 and thereby actively manages the flow rate at which sealing liquid 168 is delivered to the seal 130. As the system detects a reduction in the pressure differential across the seal 130, the flow rate of sealing fluid 168 could be commensurately reduced, reducing the bulk swirl of the sealing liquid 168, and at the same time reducing parasitic losses on the system.

In further examples, the continual, intermittent or periodic supply of sealing fluid 168 into the sealing fluid zone 166 can be controlled by one or more of a controller, pump or fluid delivery system (not shown) to control the delivery, rate or location of a quantity of sealing fluid 168 into the sealing fluid zone 166. In further examples, the supply of sealing fluid 168 into the working fluid zone 166 can be controlled by a controller in conjunction with a sensor (not shown) to sense an operating condition of at least a part of the apparatus 130. Thus, the sensor can be configured to transmit a signal for the sensed operating condition to the controller before the controller supplies an operating instruction controlling a quantity of sealing fluid 169 to be provided into the working fluid zone 166. The operating instruction may be dependent on an offset between the operating condition of the seal arrangement and a predetermined operating condition. The operating instruction may be to provide a quantity of sealing fluid 168 to the sealing fluid zone 166 at a particular intermittent or constant rate, reducing the offset between the operating condition of the seal arrangement and the predetermined condition. Thus, the system could be used, in conjunction with an active control system to manage the leakage through it by adjusting the sealing liquid flow rate to initiate, control and terminate leakage through the seal 130. In this way, the system could be used as a threshold detection system to indicate, for example, that:
a) An upper pressure differential threshold had been reached
b) A lower rotational speed threshold had been reached
c) A lower seal liquid flow rate threshold had been reached.

In applications where there is a requirement to match a variable seal pressure differential across the seal arrangement described in relation to FIGS. 3a, 3b, 4a and 4b, and thereby control the leakage past the seal arrangement 130 in a system with a constant circumferential or tangential speed, the seal liquid delivery rate may be adjusted and actively managed to match the desired variation of the seal pressure differential.

Figure 5:
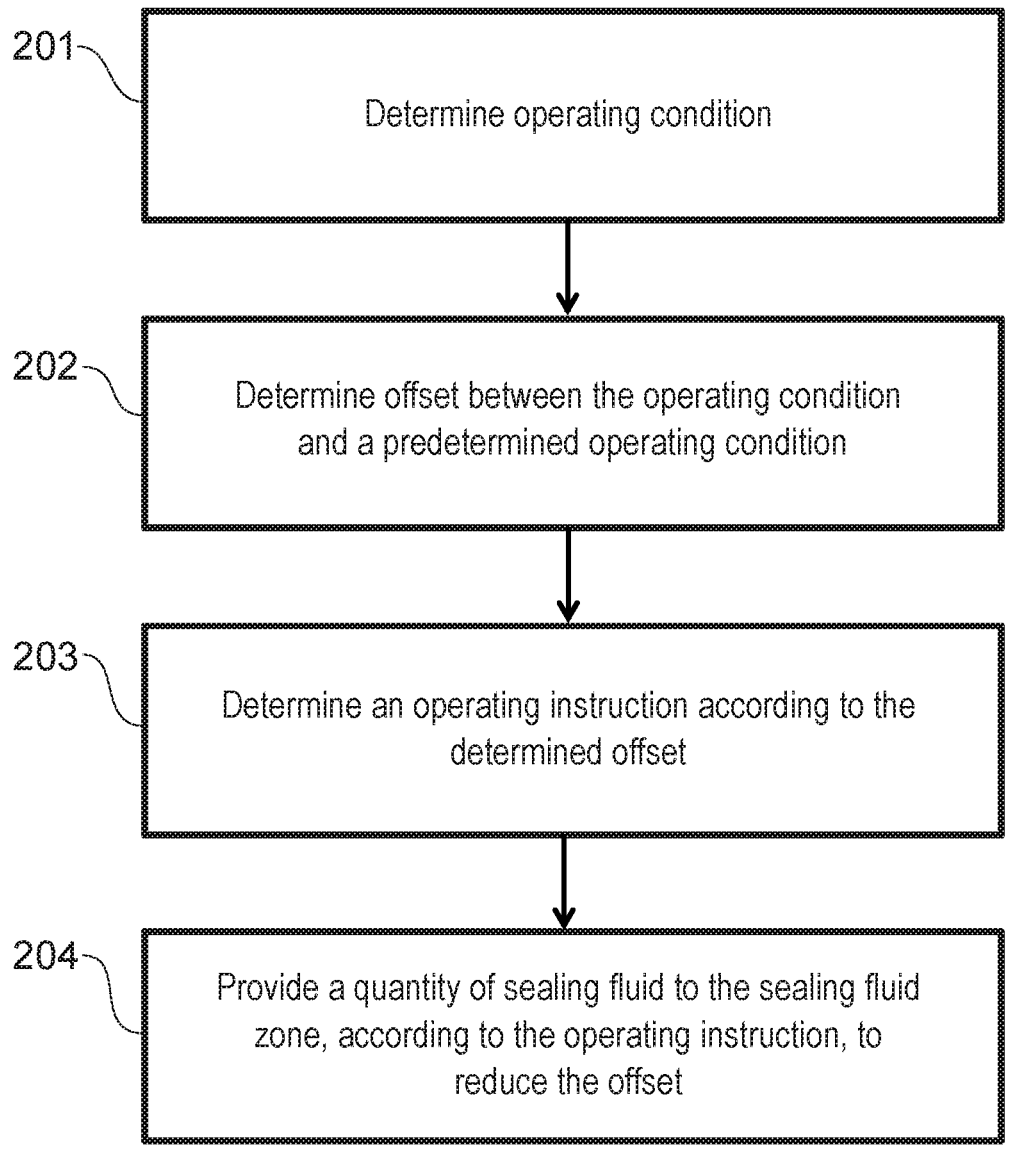
FIG. 5 shows steps to control leakage through the hydraulic seal arrangement according to examples of the present disclosure.

FIG. 5 shows steps to control leakage through the hydraulic seal arrangement. Step 201 includes determining an operating condition of the seal arrangement. Step 202 includes providing the operating condition of the seal arrangement to a control device, the control device being configured to determine an offset between the operating condition of the seal arrangement and a predetermined operating condition. Step 203 includes determining an operating instruction according to the determined offset, the operating instruction providing a quantity, location or rate of delivery of sealing fluid to be delivered to the sealing fluid zone. Step 204 includes providing a quantity of sealing fluid to the sealing fluid zone, according to the operating instruction, to reduce the offset between the operating condition of the seal arrangement and the predetermined condition.

As shown and described in relation to FIGS. 3a, 3b, 4a and 4b the seal liquid 168 is not delivered into the seal 130 linearly from a static source, but is introduced into the seal 130 from one or other of the rotating elements 132,134 of the seal 130. By this means the sealing liquid 168 enters the seal 130 with a rotational speed similar to that of the seal element from which it was delivered 132,134. By making better use of the high-pressure at which the sealing liquid 168 is delivered to the seal 130, the sealing may be pre-swirled into the seal 130, achieving higher levels of swirl on entry to the seal 130 than the surface speed of the seal element 132,134 from which it is delivered. In further examples, the seal 130 could be made entirely as a result of swirling the sealing liquid into the seal 130 at high velocity, removing the need for rotation of the seal elements 132,134. Similarly, provided the sealing liquid 168 is sufficiently highly swirled on entry to the seal 130, the described arrangements and further examples could be used to seal a contra-rotating system in which the seal fin 132 and housing 134 elements rotate in opposite directions.

It will be appreciated that due to the high-temperature environments encountered during use, the hydraulic seal arrangements 130 described in relation to FIGS. 3a, 3b, 4a and 4b may be comprised of high temperature and creep resistant materials such as, for example, titanium, nickel, or steel alloys or superalloys. In addition to, or in conjunction with the alloy or superalloy materials previously described, ceramic reinforcement or coating materials may be additionally or alternatively used in the construction of either or both of the hydraulic seal arrangement 130, shaft 136 and seal fin 132.

Consequent benefits, in terms of thermodynamic cycle efficiency, would be expected to accrue from the use of such high-pressure ancillary systems. The hydraulic seals 130 described in relation to FIGS. 3a, 3b, 4a and 4b may also be used in a variety of further applications provided relative rotation of at least one element of the seal 130 can be engineered. Thus, the hydraulic seals 130 described in relation to FIGS. 3a, 3b, 4a and 4b could be employed in predominantly static applications, such as nuclear engineering applications where zero-leakage sealing is a priority.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A hydraulic seal arrangement for a rotating machine, the hydraulic seal arrangement comprising:
an annular housing disposed around a shaft having an axis of rotation, the shaft and the annular housing being relatively rotatable, the annular housing comprising a sealing fluid zone within a radially outer portion of an interior of the annular housing; and
a fin extending radially from the shaft into the annular housing, at least a portion of the fin extending radially into the sealing fluid zone, wherein:
sealing fluid introduced through the shaft is centrifugally accelerated, in use, before being directly introduced into the sealing fluid zone by a sealing fluid inlet, to generate a swirl component upon introduction therein;
in use, the sealing fluid zone is filled with the sealing fluid so that the sealing fluid extends across an entire radial distance between a tip end of the fin and a face of a radially outer wall of the annular housing that is opposite the tip end of the fin; and
the sealing fluid introduced by the sealing fluid inlet is a liquid.

2. The hydraulic seal arrangement as claimed in claim 1, wherein the sealing fluid inlet is configured within the fin.

3. The hydraulic seal arrangement as claimed in claim 1, wherein the sealing fluid inlet is configured at a radially outer portion of the fin.

4. The hydraulic seal arrangement as claimed in claim 1, wherein the sealing fluid inlet is configured within the annular housing.

5. The hydraulic seal arrangement as claimed in claim 1, wherein the annular housing and fin co-rotate.

6. The hydraulic seal arrangement as claimed in claim 1, wherein the annular housing and fin contra-rotate.

7. The hydraulic seal arrangement as claimed in claim 1, wherein discharge of the sealing fluid from the sealing fluid inlet is in a direction having either or both of a radial or an axial component relative to the axis of rotation of the shaft.

8. The hydraulic seal arrangement as claimed in claim 1, wherein discharge of the sealing fluid from the sealing fluid inlet is angled in a direction of either or both of a rotation of the fin or a rotation of the annular housing.

9. The hydraulic seal arrangement as claimed in claim 1, wherein the sealing fluid is introduced into the sealing fluid zone at an angle of between about 70 and about 75 degrees from a radial direction.

10. The hydraulic seal arrangement as claimed in claim 1, wherein the sealing fluid is introduced into the sealing fluid zone at a relative exit rotational velocity which exceeds a rotational velocity of the fin.

11. The hydraulic seal arrangement as claimed in claim 1, wherein the sealing fluid is introduced into the sealing fluid zone at a relative exit rotational velocity which exceeds a rotational velocity of the annular housing.

12. The hydraulic seal arrangement as claimed in claim 1, wherein the sealing fluid inlet is one of a plurality of sealing fluid inlets.

13. The hydraulic seal arrangement as claimed in claim 1, further comprising a sensor to sense an operating condition of at least a part of the hydraulic seal arrangement, the sensor being configured to transmit a signal for the sensed operating condition.

14. The hydraulic seal arrangement as claimed in claim 13, further comprising a controller to receive the signal for the sensed operating condition and to control delivery of the sealing fluid into the sealing fluid zone.

15. A method of controlling leakage through the hydraulic seal arrangement as claimed in claim 14, the method comprising:
    determining the operating condition of the seal arrangement;
    providing the operating condition of the seal arrangement to a control device, the control device being configured to determine an offset between the operating condition of the seal arrangement and a predetermined operating condition;
    determining an operating instruction according to the determined offset, the operating instruction providing a quantity, location, or rate of delivery of sealing fluid to be delivered to the sealing fluid zone; and
    providing a quantity of sealing fluid to the sealing fluid zone, according to the operating instruction, to reduce the offset between the operating condition of the seal arrangement and the predetermined condition.

16. A hydraulic seal arrangement for a rotating machine, the hydraulic seal arrangement comprising:
    an annular housing disposed around a shaft having an axis of rotation, the shaft and the annular housing being relatively rotatable, the annular housing comprising a sealing fluid zone within a radially outer portion of an interior of the annular housing;
    a fin extending radially from the shaft into the annular housing, at least a portion of the fin extending radially into the sealing fluid zone, wherein:
    sealing fluid introduced through the shaft is centrifugally accelerated, in use, to a circumferential velocity or tangential speed which is at least substantially equivalent to either or both of the circumferential velocity or tangential speed of the sealing fluid inlet, before being directly introduced into the sealing fluid zone by a sealing fluid inlet configured to generate a swirl component within the sealing fluid zone upon introduction of the sealing fluid therein;
    in use, the sealing fluid zone is filled with the sealing fluid so that the sealing fluid extends across an entire radial distance between a tip end of the fin and a face of a radially outer wall of the annular housing that is opposite the tip end of the fin; and
    the sealing fluid introduced by the sealing fluid inlet is a liquid.

* * * * *